US012762214B2

(12) United States Patent
Fuse

(10) Patent No.: US 12,762,214 B2
(45) **Date of Patent: *Oct. 13, 2026**

(54) INFORMATION PROCESSING APPARATUS, STORAGE MEDIUM, AND CONTROL METHOD

(71) Applicant: CANON KABUSHIKI KAISHA, Tokyo (JP)

(72) Inventor: Hiroshi Fuse, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

This patent is subject to a terminal disclaimer.

(21) Appl. No.: 18/776,108

(22) Filed: Jul. 17, 2024

(65) Prior Publication Data

US 2024/0370531 A1 Nov. 7, 2024

Related U.S. Application Data

(63) Continuation of application No. 17/360,940, filed on Jun. 28, 2021, now Pat. No. 12,067,088.

(30) Foreign Application Priority Data

Jul. 1, 2020 (JP) ................................ 2020-114216

(51) Int. Cl.
*G06F 21/10* (2013.01)

(52) U.S. Cl.
CPC ........ *G06F 21/105* (2013.01); *G06F 21/1073* (2023.08)

(58) Field of Classification Search
CPC ............... G06F 21/105; G06F 21/1073; G06F 9/44542; G06F 8/65; G06F 21/51; G06F 9/451; G06F 3/12; G06F 21/57
See application file for complete search history.

(56) References Cited

U.S. PATENT DOCUMENTS

| | | | | |
|---|---|---|---|---|
| 7,734,550 | B1 * | 6/2010 | Bennett | G06F 21/105 705/57 |
| 8,667,599 | B2 * | 3/2014 | Tsuboi | G06F 21/608 713/153 |
| 8,826,145 | B1 * | 9/2014 | Kirkpatrick | G06F 5/00 715/239 |
| 9,514,288 | B2 * | 12/2016 | Yoshinari | G06F 21/31 |

(Continued)

FOREIGN PATENT DOCUMENTS

| | | |
|---|---|---|
| JP | 2015014817 A | 1/2015 |
| JP | 2016157428 A | 9/2016 |

(Continued)

*Primary Examiner* — David Garcia Cervetti
(74) *Attorney, Agent, or Firm* — Canon U.S.A., Inc. IP Division

(57) ABSTRACT

A method for an information processing apparatus in which a hybrid application having both a function of a native application and a function of a web application operates and that is communicable with a server, the method includes transmitting, upon acceptance of a predetermined user operation, an acquisition request for information about the web application to the server, reading information about the native application saved in advance in the hybrid application, and displaying information generated from the acquired information as a response to the acquisition request and the read information, as a result of the predetermined user operation.

14 Claims, 9 Drawing Sheets

(56) References Cited

U.S. PATENT DOCUMENTS 9,767,317 B1 * 9/2017 Chakrovorthy ......... G06F 21/71
9,798,864 B2 * 10/2017 Statchuk ............. G06F 21/6218
10,255,009 B1 * 4/2019 Iwamoto ............... G06F 3/1255
10,305,961 B2 * 5/2019 Yasuhara .............. H04L 67/025
10,534,912 B1 * 1/2020 Youngberg ........... G06F 21/577
10,735,449 B2 * 8/2020 Weinstein ............. H04L 67/535
10,747,852 B1 * 8/2020 Dalessio ................... G06F 8/71
11,586,710 B2 * 2/2023 Aigner .................. G06F 21/123
11,778,118 B2 * 10/2023 Sato ................... H04N 1/00938 358/1.15
11,785,163 B2 * 10/2023 Hatada .................. G06F 3/1224 358/1.15
11,842,100 B2 * 12/2023 Hanai ................... G06F 3/1255
12,321,742 B2 * 6/2025 Yoshioka .................. G06F 8/65
2002/0188608 A1 * 12/2002 Nelson .................... G06F 21/10
2004/0249653 A1 * 12/2004 Le ......................... G06F 21/105 705/59
2005/0010532 A1 * 1/2005 Garibay ................. G06Q 30/02 705/59
2005/0216420 A1 * 9/2005 Padole ................ G06F 21/1011 705/59
2007/0107067 A1 * 5/2007 Fountian ................... G06F 8/60 726/33
2007/0244826 A1 * 10/2007 Wang .................... G06F 21/105 705/59
2007/0271190 A1 * 11/2007 Foster ................... G06F 21/105 705/59
2008/0209393 A1 * 8/2008 Evensen ................... G06F 8/43 717/108
2008/0243699 A1 * 10/2008 Hilerio .................. G06F 21/105 705/58
2009/0031432 A1 * 1/2009 Wakai ..................... G06F 21/10 726/33
2009/0037287 A1 * 2/2009 Baitalmal ............. G06F 21/128 705/27.1
2009/0037337 A1 * 2/2009 Baitalmal .............. G06Q 99/00 705/59
2009/0037452 A1 * 2/2009 Baitalmal ............... G06F 16/27
2009/0037492 A1 * 2/2009 Baitalmal ............... G06F 16/27
2009/0327498 A1 * 12/2009 Sampath ................. H04L 63/20 709/228
2010/0057674 A1 * 3/2010 O'Donnell ............. G06Q 30/00 726/28
2010/0185686 A1 * 7/2010 Weigert .................. G06F 21/10 707/E17.044
2010/0241469 A1 * 9/2010 Weigert .............. G06F 11/3604 717/124
2010/0242028 A1 * 9/2010 Weigert ................ G06F 21/105 717/131
2011/0196793 A1 * 8/2011 Zheng ................ G06Q 30/0601 705/26.1
2011/0252415 A1 * 10/2011 Ricci ...................... G06Q 10/06 717/173
2011/0289003 A1 * 11/2011 Womack ............... G06F 21/105 705/310
2012/0124522 A1 * 5/2012 Ookuma ............ H04N 1/00464 715/840
2013/0080887 A1 * 3/2013 Hou ...................... G06F 40/137 715/273
2013/0247030 A1 * 9/2013 Kay .................... H04L 63/1441 717/178
2013/0254744 A1 * 9/2013 Sahoo ....................... G06F 8/71 717/123
2013/0286425 A1 * 10/2013 Nakamura ............ G06F 3/1222 358/1.13
2013/0339251 A1 * 12/2013 Saxena ................... G06F 21/10 705/59
2014/0282119 A1 * 9/2014 Wouhaybi ........... G06F 3/04883 715/760
2015/0120440 A1 * 4/2015 Jung .................. G06Q 30/0253 705/14.51
2015/0248302 A1 * 9/2015 Wang .................. G06F 9/44536 709/219
2015/0281869 A1 * 10/2015 Ramachandran ....... H04W 4/50 455/418
2015/0356280 A1 * 12/2015 Lori ...................... G06F 21/105 726/26
2016/0044010 A1 * 2/2016 Yasuhara .............. H04L 63/062 713/171
2016/0202972 A1 * 7/2016 Sass .......................... G06F 8/75 717/121
2016/0253171 A1 * 9/2016 Zang ..................... H04L 67/562 717/101
2017/0032378 A1 * 2/2017 Ciszewski ............ G06Q 30/018
2017/0329939 A1 * 11/2017 Yuki ..................... G06F 21/608
2017/0352115 A1 * 12/2017 Trevathan ............ G06Q 50/184
2018/0039787 A1 * 2/2018 Watariuchi ............ H04L 63/123
2018/0329689 A1 * 11/2018 Bauer ........................ G06F 8/34
2018/0336371 A1 * 11/2018 Fortmann ........... G06F 21/6281
2019/0073207 A1 * 3/2019 Sakai ........................ G06F 8/62
2019/0163453 A1 * 5/2019 Seksenov ................ H04L 67/34
2019/0278887 A1 * 9/2019 Ramanujam ............ G06F 9/455
2020/0026512 A1 * 1/2020 Yu ............................. G06F 8/75
2020/0226521 A1 * 7/2020 Palavalli ............... G06F 9/5077
2021/0064723 A1 * 3/2021 Drake ................... H04L 9/3247
2021/0256096 A1 * 8/2021 Johnson ................ G06F 21/105
2022/0261480 A1 * 8/2022 Youngberg ........... G06F 21/563
2024/0020293 A1 * 1/2024 Sethi ................... G06F 16/2365
2026/0119096 A1 * 4/2026 Eguchi .................. G06F 3/1239

FOREIGN PATENT DOCUMENTS

JP 2019517043 A 6/2019
KR 20160094289 A 8/2016

* cited by examiner

INFORMATION PROCESSING APPARATUS, STORAGE MEDIUM, AND CONTROL METHOD

CROSS-REFERENCE TO RELATED APPLICATIONS

This application is a Continuation of U.S. patent application Ser. No. 17/360,940, filed Jun. 28, 2021, which claims the benefit of Japanese Patent Application No. 2020-114216, filed Jul. 1, 2020, both of which are hereby incorporated by reference herein in their entirety.

BACKGROUND OF THE INVENTION

Field of the Invention

The present invention relates to an information processing apparatus, storage medium, and control method.

Description of the Related Art

In recent years, many business enterprises have developed their own products using open-source software (OSS). The use of OSS has advantages such as development cost reduction and application of state-of-the-art technology. Japanese Patent Application Laid-Open No. 2016-157282 describes a method for steadily fulfilling obligations involved in an OSS license. Software applications using OSS are obliged to display the text of the license (hereinafter, called license information) for a plurality of pieces of OSS used. Such software applications also need to present the contents of an agreement between a software developer and a purchaser, called end user license agreement (EULA). Thus, many applications (hereinafter abbreviated as apps) are configured to provide the license information and EULA from the menu or a help screen.

For example, OSS is widely used for development of mobile applications (hereinafter abbreviated as mobile apps) to be installed in a mobile terminal for expansion of the functions of the mobile terminal. After being installed in a mobile terminal, some mobile apps serve as "native apps" that operate without access to a web server, and others access a web server to execute "web apps" on the web server. In general, native apps save license information therein, and web apps save license information in a web server.

In recent years, hybrid mobile apps (hereinafter, abbreviated as hybrid apps) serving as both a native app and a web app have achieved widespread proliferation. Basically, hybrid apps normally operate when being communicable with a server providing resources, but some of hybrid apps can perform some of the functions even in a non-communicable state.

Taking OSS as an example, the hybrid app needs to allow display of both the license information about OSS used in the native app and the license information about OSS used in the web app. If the both pieces of license information are saved in the hybrid app as with the conventional native apps, it is necessary to update the mobile app in the mobile terminal for updating the license information not only in the event of a change of the OSS used in the native app but also in the event of a change of the OSS used in the web app. That is, the frequency with which the mobile app needs to be updated increases, which places the burden of development on the app providers and causes inconvenience to the users. On the other hand, if both pieces of license information are saved in the web server as with the conventional web apps, it is necessary to acquire both pieces of license information from the server each time the license information is to be displayed. This increases the communication volume, which may lead to a reduction in the speed of responses to user operations.

SUMMARY OF THE INVENTION

Thus, the present invention addresses providing a method for suitably displaying information about a native app and information about a web app without degrading user convenience.

According to an aspect of the present invention, a method for an information processing apparatus in which a hybrid application having both a function of a native application and a function of a web application operates and that is communicable with a server, the method includes transmitting, upon acceptance of a predetermined user operation, an acquisition request for information about the web application to the server, reading information about the native application saved in advance in the hybrid application, and displaying information generated in response to the acquisition request and the read information, as a result of the predetermined user operation.

Further features of the present invention will become apparent from the following description of exemplary embodiments with reference to the attached drawings.

DESCRIPTION OF THE EMBODIMENTS

Exemplary embodiments for carrying out the present invention will be described with reference to the drawings. It is noted that the exemplary embodiments described below do not limit the invention in the scope of the claims and that all of combinations of features described in relation to the exemplary embodiments are not necessarily essential to the solutions of the present invention.

[System Configuration]

Figure 1:
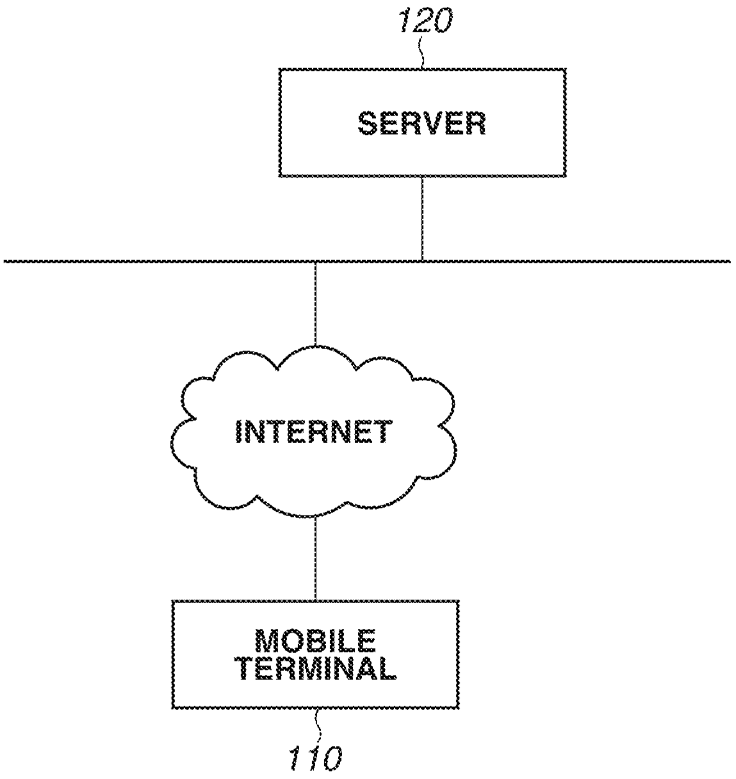
FIG. 1 is an overall view of a system.

FIG. 1 is a diagram illustrating an entire configuration of a system according to a first exemplary embodiment. An information processing system includes a mobile terminal 110 and a server 120. The mobile terminal 110 is communicably connected to the server 120 that provides various services on the Internet via a local area network (LAN) such as Wi-Fi® or a wide area network (WAN).

The mobile terminal 110, which for example may be a smartphone or tablet, has a plurality of functions such as telephone, mailer, web browser, and camera. The mobile terminal 110 is an example of information processing apparatus, which may be a personal computer (PC) or the like. The server 120 is an example of a server that has a function of saving files in various formats such as Hyper Text Markup Language (HTML) for describing web pages, JavaScript®, image, and text. The server 120 provides web pages and various types of information in response to requests from external terminals such as the mobile terminal 110.

The information processing system in the present exemplary embodiment is formed of the mobile terminal 110 and the server 120, but the information processing system is not limited to this structure.

[Hardware Configuration of the Mobile Terminal]

Figure 2:
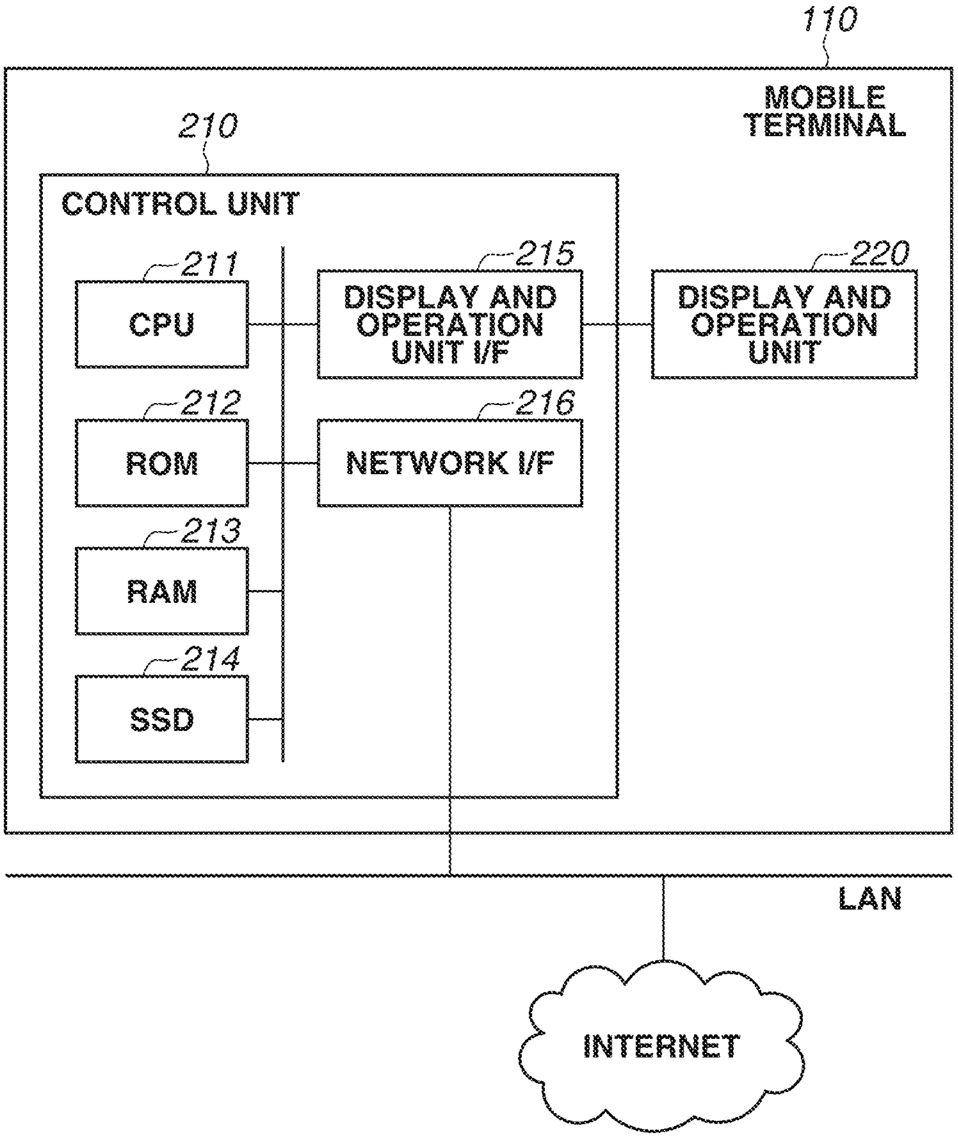
FIG. 2 is a hardware block diagram of a mobile terminal.

FIG. 2 is a hardware block diagram of the mobile terminal 110. The mobile terminal 110 includes a control unit 210 and a display and operation unit 220. The control unit 210 includes a central processing unit (CPU) 211, a read only memory (ROM) 212, a random access memory (RAM) 213, a solid state drive (SSD) 214, a display and operation unit interface (I/F) 215, and a network I/F 216 described below to control the operations of the entire mobile terminal 110. The CPU 211 reads control programs stored in the ROM 212 or the like to execute and control various functions of the mobile terminal 110 such as camera and communication. The RAM 213 is used as a temporary storage area such as the main memory or work area for the CPU 211. In the present exemplary embodiment, one CPU 211 uses one memory (the RAM 213 or the SSD 214) to execute processes described below with reference to the flowcharts, but the present invention is not limited to this. For example, a plurality of CPUs and a plurality of RAMs or SSDs may cooperate to execute the processes. The SSD 214 is a large-capacity storage unit that stores HTML files, JavaScript® files, image data, text data, various programs, and the like. The display and operation unit I/F 215 is an interface for connecting the display and operation unit 220 and the control unit 210. The display and operation unit 220 includes a touch panel display and hardware keys to accept operations, inputs, and instructions from the user or output screens to be presented to the user. The network I/F 216 is an interface for connecting the control unit 210 (of the mobile terminal 110) to a network such as a wireless LAN or WAN. The mobile terminal 110 uses the network I/F 216 to transmit or receive various types of information such as images and texts to or from services on the Internet.

[Hardware Configuration of the Server]

Figure 3:
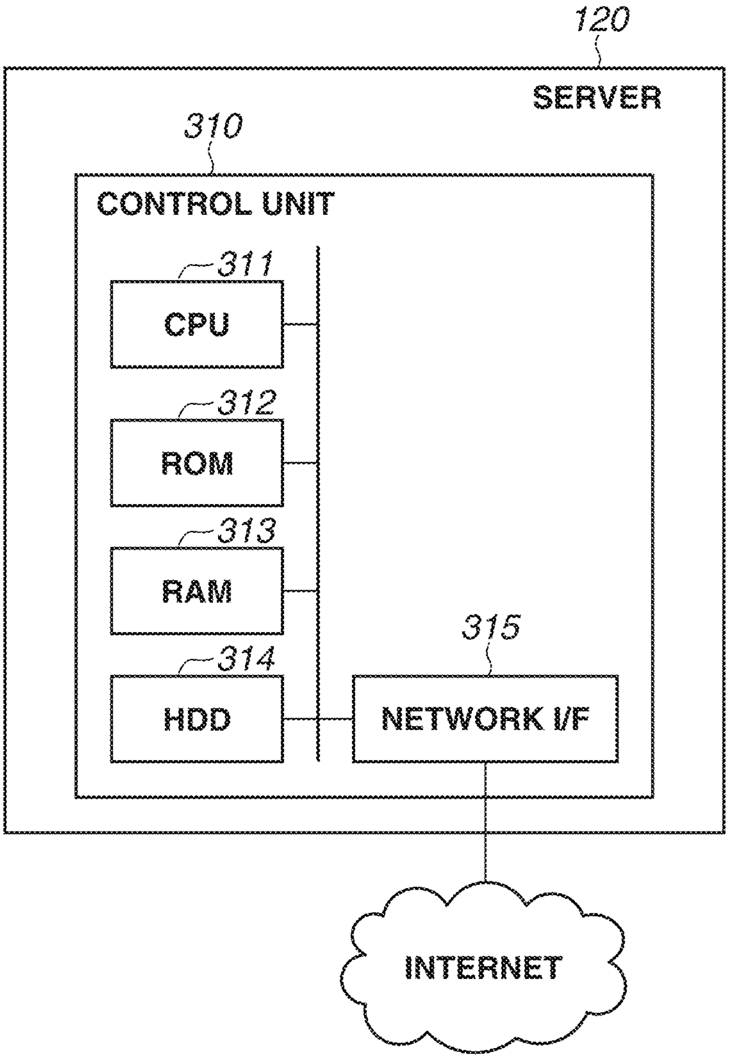
FIG. 3 is a hardware block diagram of a server.

FIG. 3 is a hardware block diagram of the server 120.

The server 120 includes a CPU 311, a ROM 312, a RAM 313, a hard disk drive (HDD) 314, and a network I/F 315. The CPU 311 reads control programs stored in the ROM 312 and executes various processes to control the entire operations. The RAM 313 is used as a temporary storage area such as the main memory or work area for the CPU 311. The HDD 314 is a large-capacity storage unit that stores HTML files, JavaScript® files, image data, text data, various programs, and the like. The network I/F 315 is an interface for connecting the server 120 to the Internet. The server 120 transmits or receives various types of information to or from another apparatus (such as the mobile terminal 110) via the network I/F 315 upon receipt of a processing request from the other apparatus.

[Software Configuration of the Information Processing System]

Figure 4:
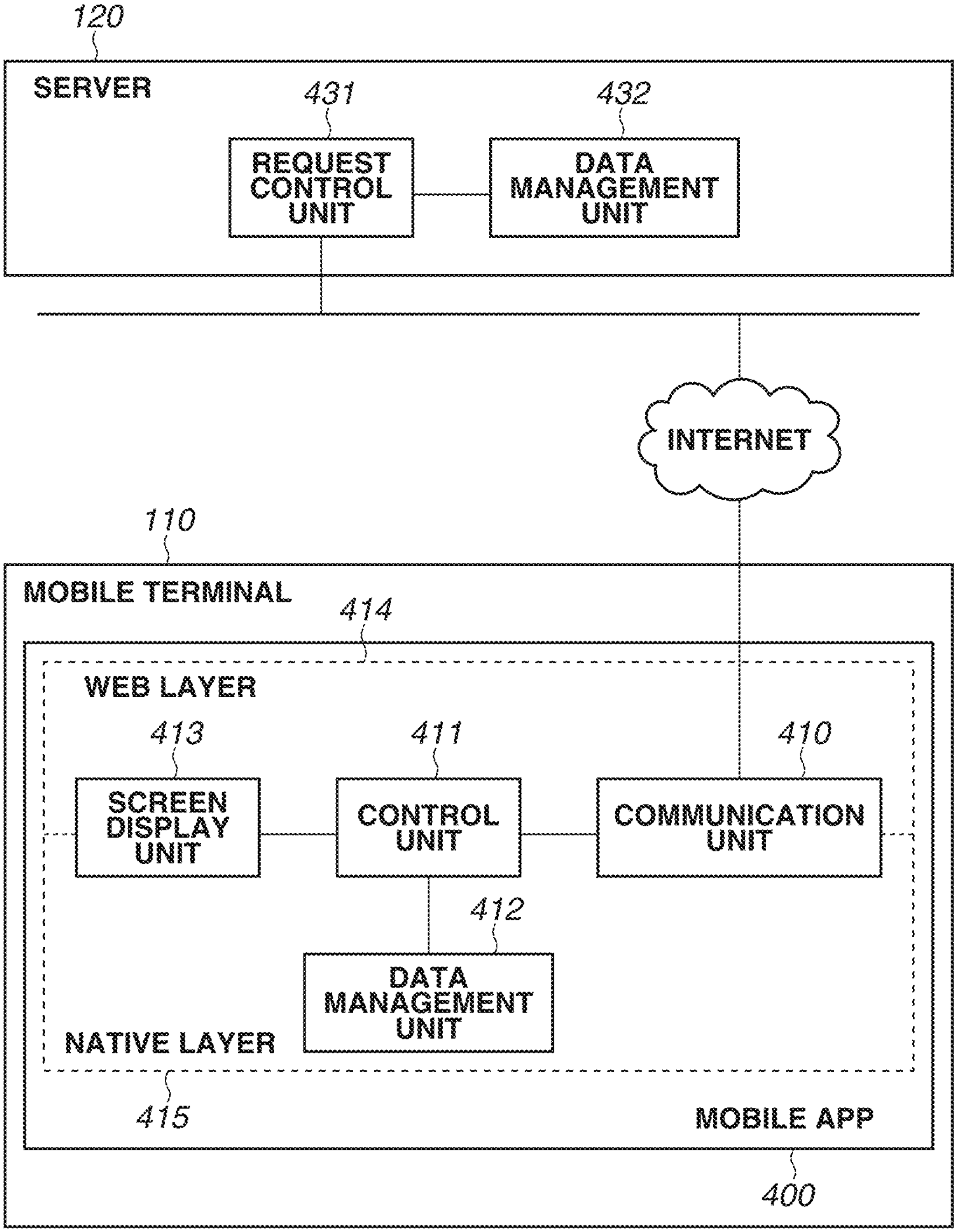
FIG. 4 is a software block diagram of the entire system.

FIG. 4 is a software block diagram of the information processing system according to the present exemplary embodiment. The functional units are implemented by the CPU 211 reading control programs stored in the ROM 212 or the SSD 214 or by the CPU 311 reading control programs stored in the ROM 312 or the HDD 314.

A mobile app 400 is an application installed on the mobile terminal 110 (hereinafter, the term application will be abbreviated as app). In general, some mobile apps serve as a native app, and others execute a web app held in a server. A native app operates with app screen information pre-installed on a mobile terminal and can execute functions (camera, access to files in the mobile terminal, and the like) specific to the mobile terminal. The native app can operate without connection of the mobile terminal to a network. On the other hand, to execute a web app, the mobile terminal accesses the server via a network each time to acquire the app screen information and the like, and displays the information on the web browser. The web app is based on web technology and is held in the server. In order to execute the web app, the mobile terminal needs to connect to a network and access the server. In addition, some mobile apps have a combination of both the function of a native app and the function of a web app (hereinafter called hybrid apps). A hybrid app contains a web layer where a web app is executed by accessing to the server and a native layer where functions specific to the mobile terminal, which cannot be processed in the web layer, are performed. The following description is based on the assumption that the mobile app 400 is a hybrid app that has a "native" layer and a "web" layer.

The mobile app 400 has a communication unit 410, a control unit 411, a data management unit 412, and a screen display unit 413, and is formed of a web layer 414 and a native layer 415. The communication unit 410, the control unit 411, and the screen display unit 413 are included in each of the web layer 414 and the native layer 415, and the data management unit 412 is included in the native layer 415. The functional units included in the layers are not limited to these units.

The communication unit 410 requests the server 120 to perform various processes. For example, in response to a request from the mobile app 400, the communication unit 410 transmits a request for screen layout information (HTML file, JavaScript® file, and the like) necessary for screen display to the server 120. The communication unit 410 also requests open source software (OSS) license information. The license information here includes the text of the license for OSS (text file or the like). The communication unit 410 uses a protocol such as Representational State Transfer (REST) or Simple Object Access Protocol (SOAP) to communicate with the server 120 but may use another means of communication.

The control unit 411 performs general control processes such as issuing a communication instruction, a screen display instruction, and a data management instruction, or executes a control method, in the mobile app 400. For example, at the time of startup of the mobile app 400, the control unit 411 acquires screen layout information from the server 120 via the communication unit 410, and issues a screen display instruction to the screen display unit 413 based on the screen layout information.

The data management unit 412 manages general information regarding the mobile app 400 such as end user license agreement (EULA) of the mobile app 400 and OSS license information. In the present exemplary embodiment, the data management unit 412 saves and manages in programs the text of the license for a plurality of pieces of OSS used in the native app on the mobile side (hereinafter, native license information) and the text of the license for a plurality of pieces of OSS used in the web app on the server side (hereinafter, web license information). For the license information, the latest data is saved in advance in the data management unit 412 at the time of installation of the mobile app. The native license information saved in the data management unit 412 is updated as necessary at the time of updating of the mobile app 400. The web license information saved in the data management unit 412 is updated when the user issues an instruction for displaying the license information and the latest license information is acquired from the server 120 via the communication unit 410 under the instruction from the control unit 411. In the present exemplary embodiment, the various data are managed in the form of text file, but the method for managing the data is not limited to this. In addition, the type of data managed is not limited to this.

The screen display unit 413 displays a user interface (UI) screen for accepting user operations on a liquid crystal display unit having the touch panel function of the display and operation unit 220 in the mobile terminal 110. The UI screen here is a screen provided by the server 120 and a screen stored in advance in the mobile app 400.

The server 120 has a request control unit 431 and a data management unit 432, and provides web apps to external apparatuses having accessed the server 120. The request control unit 431 is on standby in a state capable of receiving a request from an external apparatus. Upon receipt of a processing request, the server 120 instructs the data management unit 432 to perform processing as appropriate in accordance with the request. The data management unit 432 saves and manages the screen layout information and the license information of OSS used on the server side. In the event of a change of the OSS used, the license information is also updated. In response to a request from a web browser running on an information processing apparatus such as the mobile terminal 110 connected via the Internet, the data management unit 432 returns the screen layout information or the OSS license information necessary for screen display.

[Screen Transition in the Mobile App (Capable of Transmitting and Receiving Information to and from the Server)]

Figure 5:
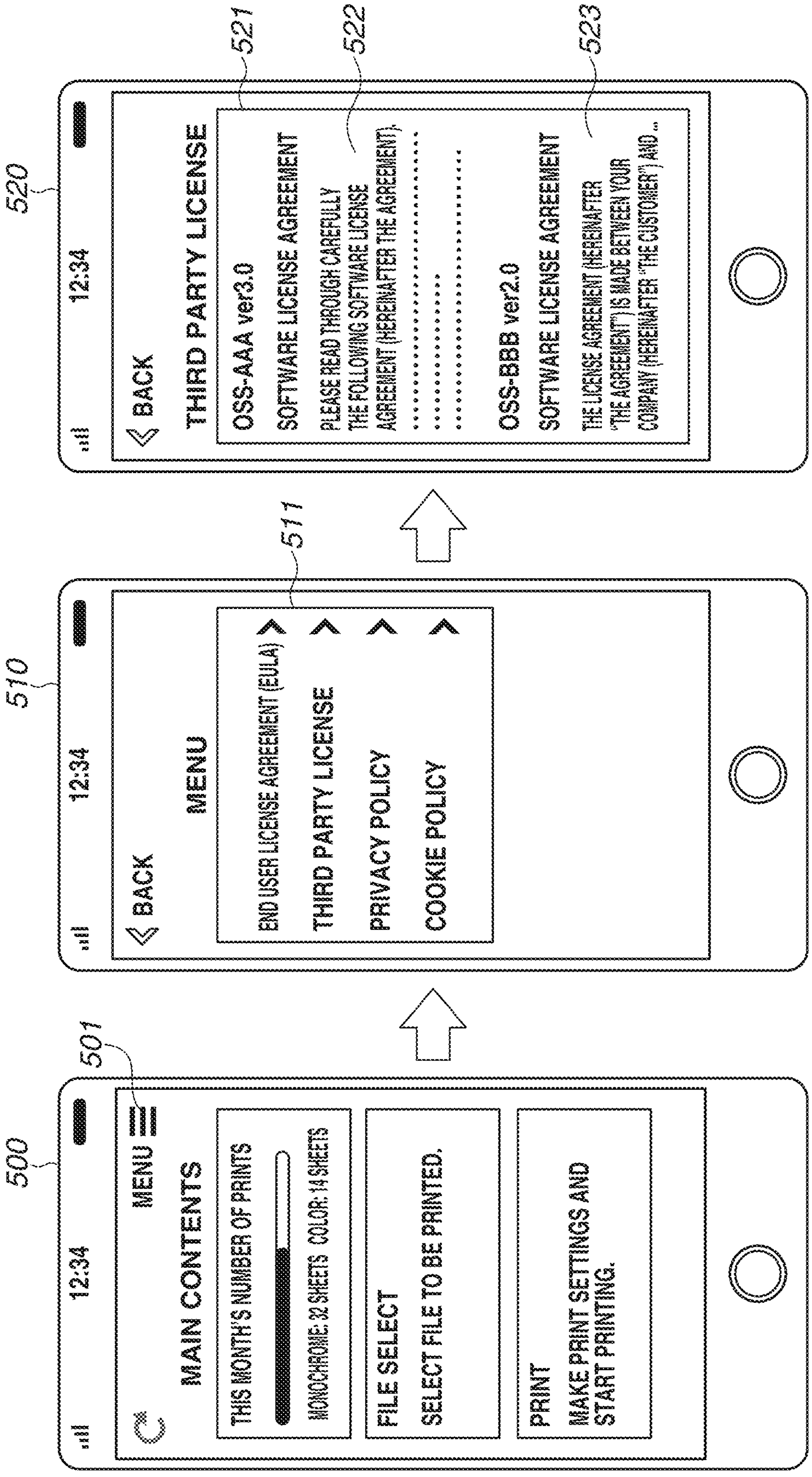
FIG. 5 is a diagram illustrating on-line screen transition of a mobile app.

FIG. 5 is a diagram illustrating an example of screen transition in the mobile app 400 in a state capable of transmitting and receiving information to and from the server 120. The mobile app 400 is an app that instructs a printer (not illustrated) to print an image captured by the camera of the mobile terminal 110 or an image saved in the SSD 214 of the mobile terminal 110 via the screens provided by the server 120. The camera function and the function of accessing a file in the mobile terminal 110 are performed in the native layer, and the display of a screen for the user to issue a print instruction and the execution of the print instruction are performed in the web layer. The mobile app 400 has both the function of a native app and the function of a web app. Thus, it is necessary to display on the mobile app 400 both the license information of OSS used in the native app and the license information of OSS used in the web app.

First, when the mobile app 400 is started, the mobile app 400 acquires from the server 120 the screen layout information necessary for screen display, and displays a web page in the display area of a main screen 500. Then, when a menu button 501 on the main screen 500 is operated, the screen transition to a menu screen 510 takes place. Displayed on the menu screen 510 is a link menu 511 including links to the EULA related to the mobile app 400, the third-party license, and the like. The link to the third-party license is a link for displaying the text of the license for the plurality of pieces of OSS used in the mobile app 400.

Next, when the third-party license in the link menu 511 is pressed, the screen transition to a document screen 520 on which a third-party license 521 is displayed takes place. FIG. 5 illustrates an example where the third-party license is pressed in the link menu 511. However, if another link is pressed, the transition to the screen corresponding to the pressed link takes place. The displayed third-party license 521 includes the text of the license for the plurality of pieces of OSS used in the native app and the web app (native license information 522 and web license information 523). The native license information is saved into the data management unit 412 at the time of installation or updating of the mobile app. The web license information may also be saved into the data management unit 412 at the time of installation of the mobile app. For display of the text of the license, the license information stored in the data management unit 412 is displayed. At this time, if the mobile terminal 110 is on-line and capable of communicating with the server 120, the mobile terminal 110 communicates with the server 120 to acquire the web license information, and displays the acquired web license information together with the pre-saved native license information.

In this way, if the mobile app 400 is communicable with the server 120 at the time of displaying the license information, the mobile app 400 acquires the web license information 523 from the server 120. At this time, the mobile app 400 may save the acquired web license information 523 into the data management unit 412 or may update the web license information saved in the data management unit 412 with the acquired web license information 523. In this way, when the mobile app 400 is communicable with the server 120, the mobile app 400 can display the latest web license information 523.

In general, a native app saves license information therein and updates the saved license information at the time of updating of the app. If the mobile app 400 saves the native license information and the web license information therein as the native app does, the mobile app 400 needs to request the user to update the app with each change of the web license information. The frequency of change of OSS used in the web app is higher than that in the native app, that is, the web license information is frequently changed. Requesting the user to update the app as with the native app will cause inconvenience to the user. Thus, acquiring the web license information from the server when the mobile terminal is on-line makes it possible to avoid unnecessary updating.

In general, a web app saves web license information in a server so that the mobile terminal accesses the server to acquire the license information. If both the native license information and the web license information of the mobile app 400 are saved in the server as in the case of the web app, this will increase the volume of communication data and the amount of processing time necessary for acquirement of the license information. Thus, between the native license information and the web license information, saving the native license information into the mobile app makes it possible to reduce the volume of communication data and the amount of processing time necessary for the acquirement of the license information.

[Screen Transition in the Mobile App (Incapable of Transmitting and Receiving Information to and from the Server)]

Figure 6:
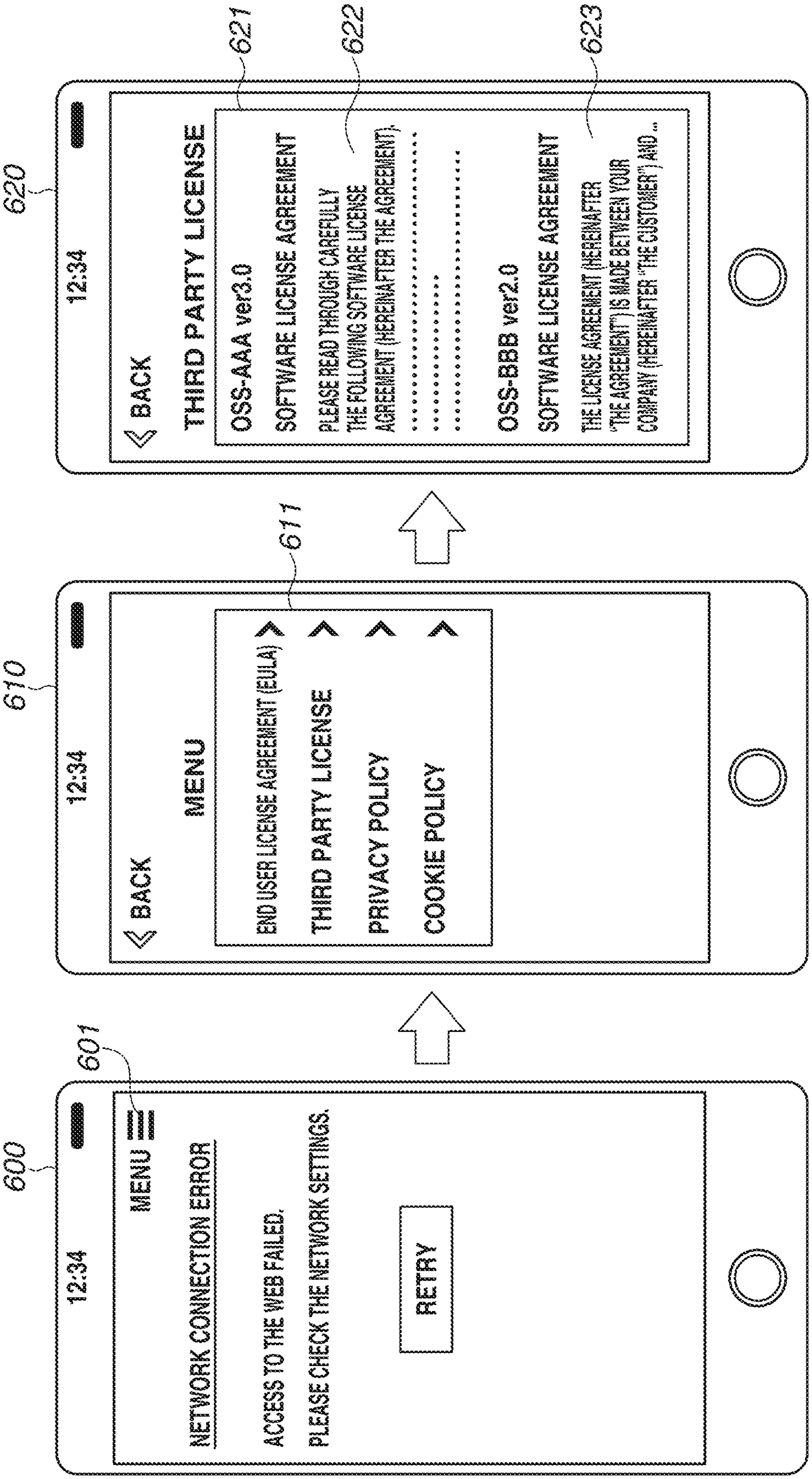
FIG. 6 is a diagram illustrating off-line screen transition of the mobile app.

FIG. 6 is a diagram illustrating an example of screen transition in the mobile app 400 in the state incapable of communication with the server 120.

First, when the mobile app 400 is started, the mobile app 400 displays a network connection error screen 600 indicating that the mobile app 400 is off-line.

When a menu button 601 in the network connection error screen 600 is pressed, the screen transition to a menu screen 610 takes place. Displayed on the menu screen 610 is a link menu 611 including links to the EULA related to the mobile app 400 and the third-party license as in the case of the menu screen 510.

Next, when any link in the link menu 611 is pressed, the screen transition to a document screen 620 corresponding to the pressed link takes place. In FIG. 6, the third-party license is pressed in the link menu 611, and then a third-party license 621 is displayed on the document screen 620. The displayed third-party license 621 includes the text of the license (native license information 622 and web license information 623) as in the case of the third-party license 521.

If the mobile app 400 is incapable of communicating with the server 120 such as when the mobile app 400 cannot be connected to the Internet or the mobile app 400 is down, the mobile app 400 displays the license information stored in the control unit 411. That is, the information in the control unit 411 is not updated. If the web license information saved in the control unit 411 has been updated because the license information was displayed on-line in the past by the user as described above, the updated web license information can be displayed.

That is, by saving into the mobile the web license information acquired in a situation where the mobile is communicable with the server, the latest possible information can be displayed even off-line.

For the native license information 522 or 622, the information saved in the data management unit 412 is displayed regardless of network status. If the text of the native license is changed, the mobile app needs to be updated because the change of the text of the native license always involves a change in the configuration of the mobile app. Thus, the text of the native license are changed at the time of updating of the mobile app.

[Software Processing and Flowchart in First Exemplary Embodiment]

Figure 7:
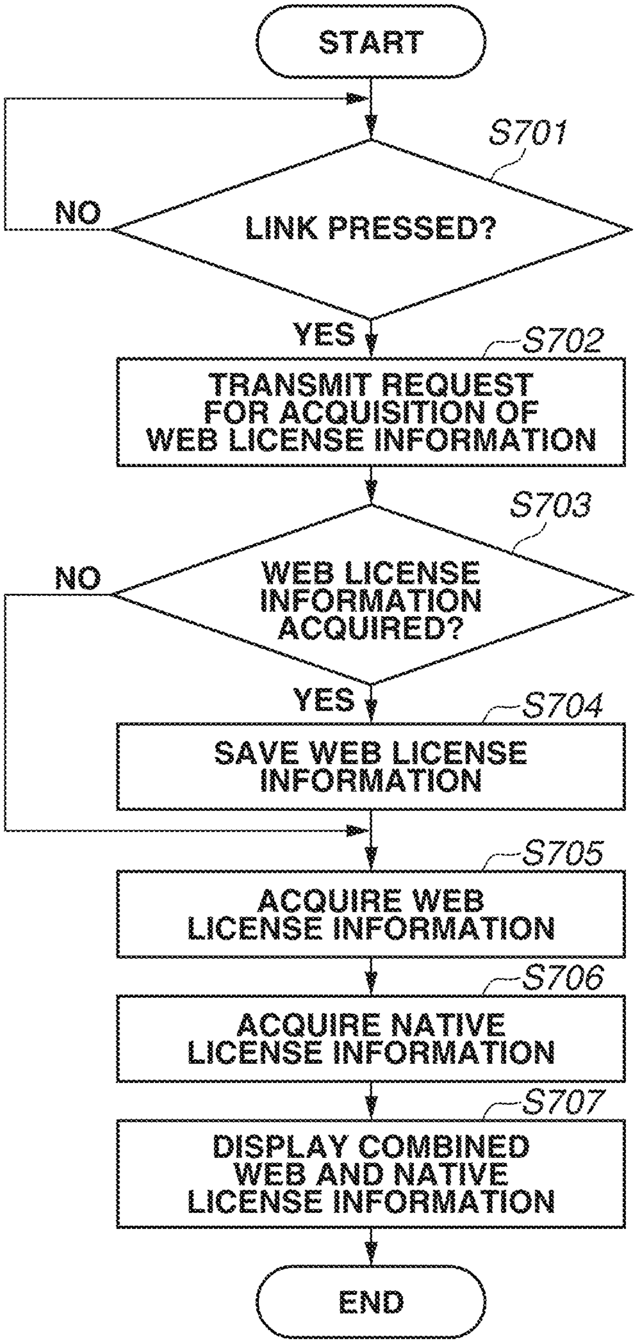
FIG. 7 is a flowchart of a license display process in the mobile app.

FIG. 7 is a flowchart illustrating details of a process for displaying the text of the license in the mobile app 400. The steps in the flowchart are implemented by the CPU 211 reading and executing control programs stored in the ROM 212 and the SSD 214. The process will now be described in detail.

This process is started by detecting that the menu screen 510 or 610 in the mobile app 400 is displayed.

In step S701, the screen display unit 413 of the mobile app 400 determines whether any link included in the link menu 511 or 611 displayed on the menu screen 510 or 610 has been pressed. If the screen display unit 413 determines that an arbitrary link has been pressed (YES in step S701), the processing proceeds to step S702. If the screen display unit 413 determines that no link has been pressed (NO in step S701), the processing returns to step S701. In the present exemplary embodiment, the arbitrary link is the "third-party license" illustrated in FIG. 5 or 6. However, the selectable information is not limited to this.

In step S702, if the communication unit 410 of the mobile app 400 is communicable with the server 120, the communication unit 410 transmits a request for transmission of the web license information to the server 120.

In step S703, the control unit 411 of the mobile app 400 determines whether the web license information has been acquired as a response to the acquisition request in step S702. If the control unit 411 determines that the web license information has been acquired (YES in step S703), the processing proceeds to step S704. If the control unit 411 determines that the web license information has not been acquired (NO in step S703), the processing proceeds to step S705.

In step S704, the control unit 411 of the mobile app 400 saves into the data management unit 412 the web license information received from the server 120 via the communication unit 410, or updates the information in the data management unit 412 with the web license information received from the server 120. Accordingly, even when the license information of the OSS used in the web app on the server 120 side has been updated, the latest license information can be saved into the data management unit 412. The processing in step S704 does not necessarily need to be executed every time but may be executed only in a case where a predetermined period of time has elapsed since the previous execution or in a case where a save instruction has been issued by the user.

In step S705, the control unit 411 of the mobile app 400 acquires the web license information from the data management unit 412.

In step S706, the control unit 411 of the mobile app 400 acquires the native license information from the data management unit 412.

In step S707, the control unit 411 of the mobile app 400 combines the license information acquired in steps S705 and S706, and displays the combined license information on the screen display unit 413, as the result of the press of the link in step S701 (the link 521 illustrated in FIG. 5 or the link 621 illustrated in FIG. 6).

As described above with reference to the flowchart, at each time the license information is displayed, if the mobile app 400 is communicable with the server 120, the mobile app 400 acquires and displays the web license information from the server 120. On the other hand, as for the license information of the native app, the license information saved in advance in the mobile app (such as at the time of installation of the mobile app) is acquired and displayed. That is, at the time of display of the information of a native app and a web app in a hybrid app, the information about the native app is acquired from the hybrid app, and the information about the web app is acquired from the server each time.

By saving the web license information acquired from the server 120 into the mobile app, the latest possible license information can be displayed in the mobile app even in the off-line environment.

Figure 8:
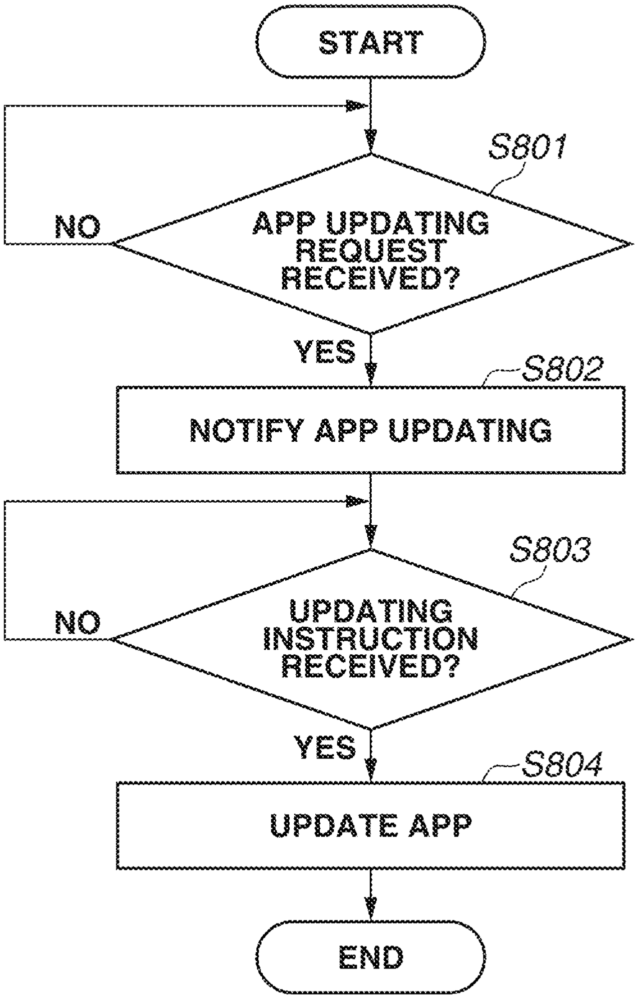
FIG. 8 is a flowchart of an update process in the mobile app.

A process for updating the native license information in the mobile app 400 will be described with reference to FIG. 8. FIG. 8 is a flowchart of a process for the mobile terminal 110 to receive an update request of the mobile app 400 and perform the updating. The steps in the flowchart are implemented by the CPU 211 reading and executing the control programs stored in the ROM 212 or the SSD 214.

In step S801, the CPU 211 determines whether an update request of the mobile app 400 has been received. If the CPU 211 determines that the update request has been received (YES in step S801), the processing proceeds to step S802. If the CPU 211 determines that no update request has been received (NO in step S801), the CPU 211 repeats step S801. In step S802, the CPU 211 notifies the user that the mobile app 400 needs updating. In step S803, the CPU 211 determines whether an instruction for determining whether the update instruction of the mobile app 400 has been accepted. If the CPU 211 determines that the instruction has been accepted (YES in step S803), the processing proceeds to S804. If the CPU 211 determines that no instruction has been accepted (NO in step S803), the CPU 211 repeats step S803.

In step S804, the CPU 211 updates the mobile app 400. At this time, the native license information saved in the data management unit 412 is updated.

As described above with reference to the flowchart, in a case where the mobile app 400 needs updating, the mobile app 400 can be updated by accepting a user operation. At the time of updating of the mobile app 400, the native license information in the app can be updated. In this example, the mobile app 400 is updated upon acceptance of a user operation. However, if automatic updating is preset, the mobile app 400 can also be automatically updated without acceptance of a user operation. The license information in the app to be updated at the time of updating of the app is not limited to the native license information but the web license information may be updated as well.

According to the above-described exemplary embodiment, when an app having both the function of a native application and the function of a web application receives an instruction for displaying the license information, the app transmits a request for acquiring the license information of the web application, and at the same time, reads the license information of the native application saved in advance in the app. Then, the app displays the license information of the web app acquired as a response to the acquisition request and the read license information of the native app.

[Software Processing and Flowchart in Second Exemplary Embodiment]

According to the method of displaying the license information described above, when the user instructs the mobile app 400 to display the text of the license from the menu screen, the mobile app 400 acquires the web license information on the server side from the server 120. Thus, there is a drawback that the web license information saved in the data management unit 412 will not be updated unless the user instructs for displaying the license information.

Thus, a method of solving the above-mentioned drawback will be described.

Figure 9:
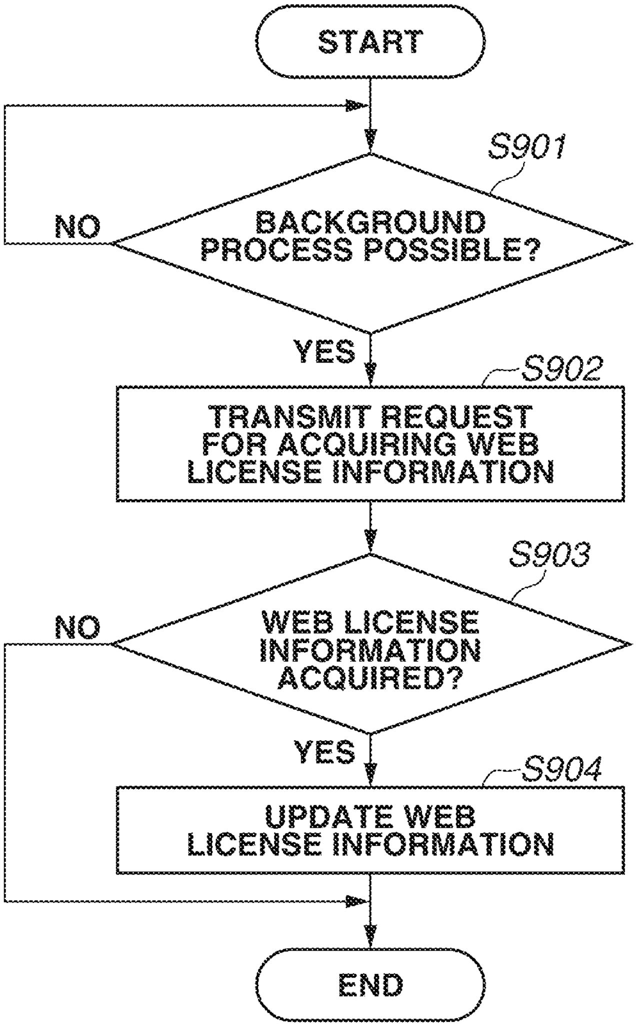
FIG. 9 is a flowchart of a background process in the mobile app.

FIG. 9 is a flowchart illustrating in detail an updating process of license information in a mobile app 400 according to a second exemplary embodiment. The steps in the flowchart are implemented by a CPU 211 reading and executing control programs stored in a ROM 212 or an SSD 214. Hereinafter, this process will be described in detail.

This process is started by detecting that the mobile app 400 is running in the background. The process in the flowchart is repeatedly executed at certain time intervals (for example, every day or two) as far as the mobile app 400 is running in the background.

In step S901, a control unit 411 of the mobile app 400 determines whether a background process is possible. If the control unit 411 determines that the background process is possible (YES in step S901), the processing proceeds to step S902. If the control unit 411 determines that the background process is not possible (NO in step S901), the processing returns to step S901.

In step S902, the communication unit 410 of the mobile app 400 transmits a request for acquisition of web license information to the server 120.

In step S903, the control unit 411 of the mobile app 400 determines whether the web license information has been acquired as a response to the acquisition request in step S902. If the control unit 411 determines that the web license information has been acquired (YES in step S903), the processing proceeds to step S904. If the control unit 411 determines that the web license information has not been acquired (NO in step S903), the processing is terminated.

In step S904, the control unit 411 of the mobile app 400 saves the web license information received from the server 120 via the communication unit 410 into the data management unit 412 or updates the information in the data management unit 412 with the web license information received from the server 120.

The method of updating the license information of the mobile app 400 has been described. This allows the web license information in the app to be updated at certain time intervals even in a case where the user has not yet displayed the license information. Accordingly, even off-line, the latest web license information acquired on-line can be displayed.

In the present exemplary embodiment, the case where the mobile app 400 updates the license information at certain time intervals while running in the background has been described as an example. However, the timing for updating is not limited to this. The mobile app 400 may update the web license information each time the mobile app 400 is started up or the server 120 may transmit a notification of necessity for updating the license information to the mobile app 400.

In the above-described exemplary embodiments, the text of the license for OSS has been displayed as an example. However, the contents to be displayed are not limited to the text of the license for OSS. For example, the above-described exemplary embodiments are also applicable to a case of displaying a EULA or the like. Further, the present invention includes systems and their functions configured by combining, as appropriate, the above-described exemplary embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method for an information processing apparatus in which a hybrid application program having a function related to a predetermined service operates, the hybrid application program having both a function of a native application program and a function of a web application program in the function related to the predetermined service, the method comprising:

accepting a predetermined user operation in the hybrid application program;

acquiring first information related to the function of the web application program in the function related to the predetermined service from a server, and acquiring second information related to the function of the native application program in the function related to the predetermined service and saved in advance in the hybrid application program, the first information being license information about the web application program, the second information being license information about the native application program;

combining the first information and the second information; and displaying the combined first information and second information in one page, wherein the license information about the web application program is information related to open source software (OSS) used in the web application program, and the license information about the native application program is information related to OSS used in the native application program.

2. The method according to claim 1, wherein the function related to the predetermined service is a function related to printing.

3. The method according to claim 1, wherein the first information is information related to a type of the OSS used in the web application program, and the second information is information related to a type of the OSS used in the native application program.

4. The method according to claim 1, wherein the first information is information related to a version of the OSS used in the web application program, and the second information is information related to a version of the OSS used in the native application program.

5. The method according to claim 1, wherein the predetermined user operation is an instruction for displaying the first information and the second information on the information processing apparatus.

6. The method according to claim 1, wherein an acquisition request for the first information is transmitted to the server.

7. The method according to claim 6, further comprising saving, in the information processing apparatus, the first information acquired as a response to an acquisition request.

8. The method according to claim 7, wherein, in a case where the first information was unable to be acquired as the response to the acquisition request, the saved first information and the second information are acquired and displayed.

9. The method according to claim 7, further comprising:

transmitting the acquisition request for the first information to the server at predetermined time intervals; and further saving the first information acquired as the response to the transmitted acquisition request.

10. The method according to claim 1, wherein the second information saved in advance in the hybrid application program is updated at a time of updating of the hybrid application program.

11. The method according to claim 1, wherein the information processing apparatus is capable of instructing a printer to print image data saved in the information processing apparatus.

12. The method according to claim 1, wherein the license information about the web application program is license terms of the OSS used in the web application program, and the license information about the native application program is license terms of the OSS used in the native application program.

13. An information processing apparatus in which a hybrid application program having a function related to a predetermined service operates, the hybrid application program having both a function of a native application program and a function of a web application program in the function related to the predetermined service, the information processing apparatus comprising:

one or more processors; and at least one memory storing executable instructions, which when executed by the one or more processors, cause the information processing apparatus to perform operations comprising:

accepting a predetermined user operation in the hybrid application program;

acquiring first information related to the function of the web application program in the function related to the predetermined service from a server, and acquiring second information related to the function of the native application program in the function related to the predetermined service and saved in advance in the hybrid application program, the first information being license information about the web application program, the second information being license information about the native application program;

combining the first information and the second information; and displaying the combined first information and second information in one page, wherein the license information about the web application program is information related to open source software (OSS) used in the web application program, and the license information about the native application program is information related to OSS used in the native application program.

14. A non-transitory computer-readable storage medium storing a program to cause a computer to perform a method for an information processing apparatus in which a hybrid application program having a function related to a predetermined service operates, the hybrid application program having both a function of a native application program and a function of a web application program in the function related to the predetermined service, the method comprising:

accepting a predetermined user operation in the hybrid application program;

acquiring first information related to the function of the web application program in the function related to the predetermined service from a server, and acquiring second information related to the function of the native application program in the function related to the predetermined service and saved in advance in the hybrid application program, the first information being license information about the web application program, the second information being license information about the native application program;

combining the first information and the second information; and displaying the combined first information and second information in one page, wherein the license information about the web application program is information related to open source software (OSS) used in the web application program, and the license information about the native application program is information related to OSS used in the native application program.

* * * * *